United States Patent [19]
Murray et al.

[11] 3,790,794
[45] Feb. 5, 1974

[54] ABSOLUTE CALORIMETRIC DOSIMETER

[75] Inventors: Kenneth M. Murray, Alexandria, Va.; Frank H. Attix, Oxon Hill, Md.

[73] Assignee: The United States of America as represented by the Secretary of the Navy, Washington, D.C.

[22] Filed: Dec. 21, 1972

[21] Appl. No.: 317,322

[52] U.S. Cl............... 250/352, 73/355 R, 250/370
[51] Int. Cl. ............................................. G01t 1/12
[58] Field of Search ........ 73/355 R, 362 SC, 355 R; 250/352, 252, 273, 338, 370, 371, 443, 472, 473, 352, 370

[56] References Cited

UNITED STATES PATENTS

| | | | |
|---|---|---|---|
| 3,033,985 | 5/1962 | Petree................................ | 250/352 |
| 2,745,284 | 5/1956 | Fitzgerald et al. ................ | 73/355 R |
| 3,431,149 | 3/1969 | Webb................................. | 73/355 R |
| 3,103,585 | 9/1963 | Johsason et al..................... | 250/352 |
| 3,529,159 | 9/1970 | Hornstra et al...................... | 250/370 |

Primary Examiner—Harold A. Dixon

[57] ABSTRACT

A device for determining radiation dose by measuring a change of temperature in a material due to incident radiation on the material.

7 Claims, 3 Drawing Figures

ABSOLUTE CALORIMETRIC DOSIMETER

BACKGROUND OF THE INVENTION

This invention is directed to a device for determining radiation dose and more particularly to a standard radiation dose measuring device against which other types of dosimeters may be calibrated for X-radiation.

Heretofore, dosimeters have been calibrated in standard fields produced by gamma radiation from $^{60}$Co or $^{137}$Cs standard sources. Such methods are acceptable for monochromatic photons whose energies are less than one MeV but when a continuous distribution of photon energies from a fraction of an MeV to 10 MeV or greater are present such a calibration is not valid.

Radiation calorimeter dosimeters have been made previously such as set forth in U.S. Pat. Nos. 3,033,985; 3,394,278; 3,096,440; and 3,222,522. These devices require complicated structures, additional heating elements for heating the detector element with an additional heat detector which is compared to a main calibration device for determining radiation dose. In the prior art calorimeter devices, calibration was achieved by means of a heating system which did not introduce heat uniformily throughout the calorimeter and its mantle, therefore, a second heating unit and temperature sensing means was required to insure accuracy of calibration.

SUMMARY OF THE INVENTION

The device of this disclosure is used in measuring radiation dose by use of a small spherical element made of a material which will give the dose in rads for that material. The small sphere of material is centrally located within a larger sphere or mantle of like material and separated therefrom by standoff elements which form a small spacing between the small sphere and the surrounding element. The radial thickness of the larger spherical element is determined empirically so as to achieve equilibrium of secondary radiation produced by X-rays generated by electrons of energy specified by the intended use. The temperature of the small sphere due to incident radiation is measured by a temperature sensing element imbedded at the center of the small sphere. The temperature sensing element is connected to suitable electrical circuitry including an indicator for indicating any detected temperature change of the central sphere. The temperature change is used in determining the radiation dose. Therefore, the radiation dose is determined by exposure of the device to radiation. The dose is related to the temperature change in the spherical elements and to the specific heat of the material. The specific heat of the material is well known, so that due to the adiabaticity of the measurement, an absolute determination of dose is provided without the requirement of calibration either by a standard radiation field or through an electrical heating system.

STATEMENT OF THE OBJECTS

It is therefore an object of the present invention to provide a radiation detection device which is simple in construction, compact, highly sensitive and highly accurate in determining radiation dose.

Another object is to provide a calorimeter type radiation detector which does not require an additional heating calibration circuit.

Still another object is to provide a calorimeter-dosimeter which depends upon an accurate calibration of a single temperature sensing element and an accurate knowledge of the specific heat of the material within which the sensing element is contained.

Yet another object is to provide a standard radiation dose measurement against which other types of dosimeters may be calibrated for X-radiation fields with photon energies up to the maximum for which the mantle thickness was determined.

Still another object is to provide a calorimeter-dosimeter in which the radiation dose measurement time is short.

Other objects and advantages will become obvious upon reading of the specification when considered with the drawings.

DESCRIPTION OF THE DEVICE

Figure 1:
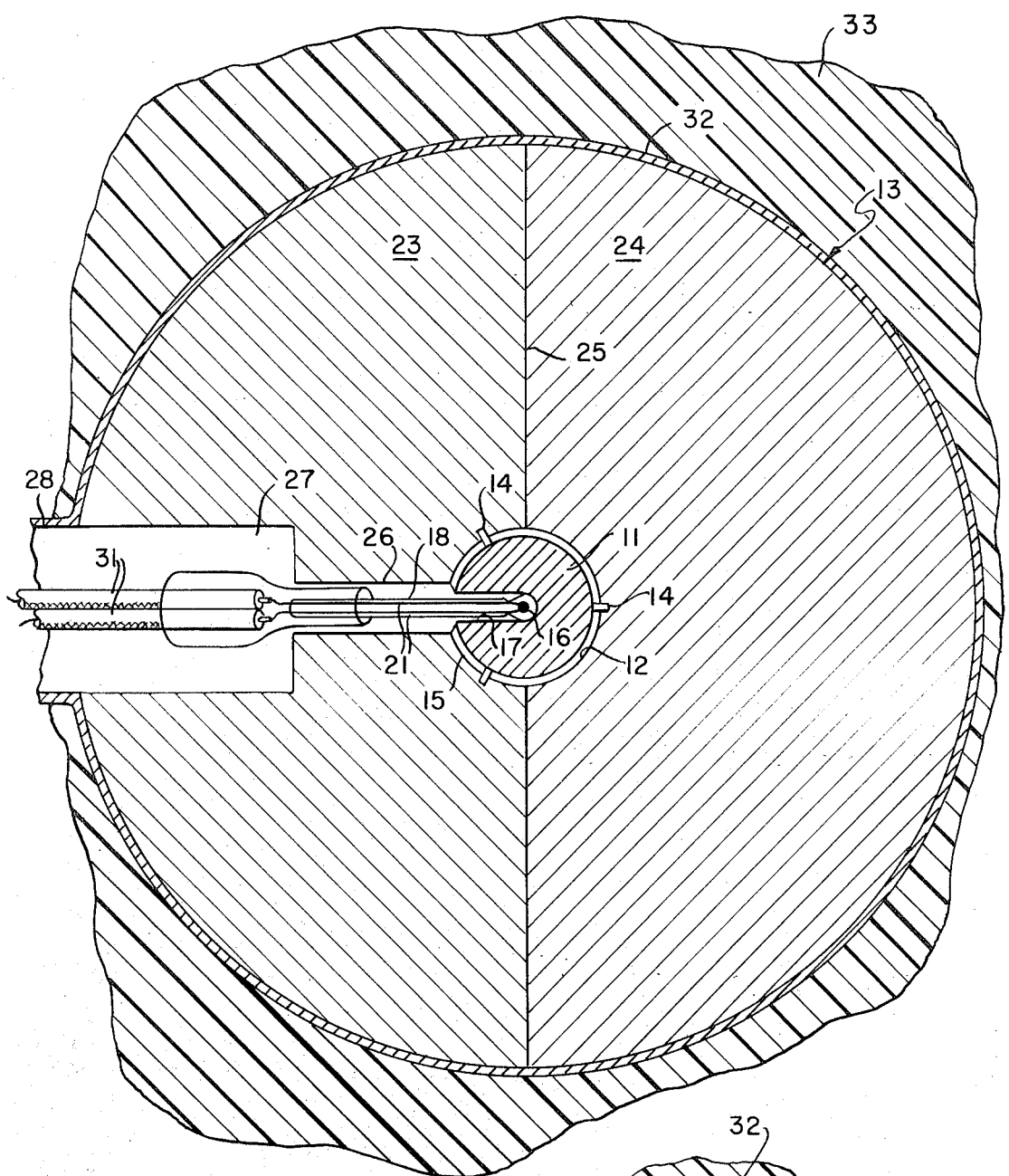
FIG. 1 illustrates a detailed cross-sectional view of the radiation-to-heat conversion elements including a temperature probe at the center thereof.
Figure 2:
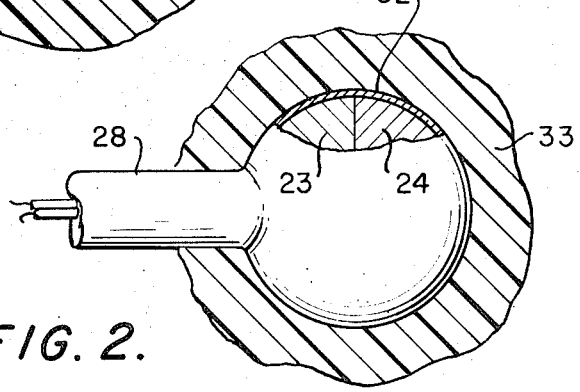
FIG. 2 illustrates the overall device.

Referring now to the drawing, there is shown by illustration a calorimeter-radiation detector made in accordance with the teaching of the present invention. As shown, the device includes a solid small sphere 11 of silicon or any other material that will give radiation dose in rads for that material, such as graphite to give rads in carbon, or aluminum to give rads in aluminum. The small sphere is centrally positioned within a centrally located spherical chamber 12 formed within a larger sphere or mantle 13 made of the same material as the material of the small sphere. The small sphere is positioned concentrically within the larger sphere by four spacers 14 formed within the wall of the chamber of the large sphere to form a small air gap 15 between the two spheres. The contact points need not prevent heat transfer between the two spheres since the two spheres are both heated equally at the instant of exposure to radiation. The purpose of the air gap is to provide sufficient insulation to permit the small sphere and a temperature sensing element 16 such as a resistance type, positioned at the center thereof through hole 17, to reach a common temperature. The temperature sensing element may be either a thermistor, themocouple or any other small temperature sensing device whose characteristics vary in a reproducible manner with temperature. For the purposes of this invention, a Fenwal negative temperature coefficient thermistor with a resistance in the range of 10 – 50K ohms sealed in a glass tube 18 having a diameter of 0.5mm manuractured by Fenwal Electronics Inc., Framingham, Mass. is used. The thermistor is connected into an electrical bridge circuit by use of 0.025 mm diameter platinum-iridium wires 21. The bridge circuit is a Keithley model 520 Nanowatt Dissipation Resistance bridge manufactured by Keithley Instruments, 28775 Aurora Road, Cleveland, Ohio.

The outer sphere is made in two hemispherical sections 23, 24 and then secured together by a suitable epoxy at 25 subsequent to positioning the small sphere in place within the chamber area of one of the half sections. The half section 23 of the large sphere, within which the small sphere is placed for assembly, is provided with a small hole 26 that meets with a larger hole 27 each drilled perpendicular to the flat surface of the hemispherical section. The small hole 26 permits passage of the platinum-iridium electrical lead wires 21 that connect with the heat sensing element 16 through the glass tube 18, and the larger hole receives the end of an aluminum support tube 28 that extends from the spherical element outwardly. The electrical lead wires 21 connect with electrical conductors 31 that extend through the aluminum tube and are connected to the electrical resistance bridge circuit by which a temperature change is recorded or indicated by a suitable indicator.

The large spherical element is enclosed within a 0.25 mm thick aluminum shell 32 that provides both support, and shielding against radio frequency interference to the measurement of the output for the heat sensing element. The entire spherical elements are enclosed inside a styrofoam shell 33 having a 6.5 cm outer diameter to provide thermal insulation to the spherical elements. The styrofoam insulation may be extended along the entire length of the aluminum support tube if desired for added insulation.

As an example of construction the following dimensions may be used:

0.500 cm diameter of small silicon sphere
0.051 cm diameter of hole in small sphere
0.280 cm depth of hole in small sphere
3.590 cm diameter of large silicon sphere
0.520 cm diameter of spherical chamber
0.002 cm spacing between spheres
0.152 cm small hole in large sphere
0.635 cm large hole in large sphere
0.890 cm depth of large hole in large sphere
0.0635 cm thickness of aluminum coating
6.5 cm outer diameter of styrofoam around sphere
5.0 mm ball surrounding thermistor
0.5 mm diameter of glass tube
0.025 mm electrical leads connected to thermistor It has been determined that radiation dose determination by use of a mass of a material is dependent upon the specific heat of the material and the change in the temperature produced by the incident radiation. Therefore, the device set forth above determines the temperature change in the sphere produced by incident radiation. This temperature change is then inserted into the following formula for determining dose:

$D = C_p M_c \Delta T \times 4.184 \times 10^7 / M_c \times 100$
$D = 4.184 \times 10^5 C_p \Delta T$ where
$D$ is the dose in rads silicon,
$C_p$ is the specific heat of silicon in calories gm$^{-1}$ deg. C$^{-1}$,
$\Delta T$ is the change in temperature in degrees centigrade and $M_c$ is the mass of the calorimeter in grams. The quantity $4.184 \times 10^7$, the thermochemical calorie, converts calories to ergs and the denominator converts from ergs to rads, that is 1 rad = 100 ergs per gram. It is noted that the mass of the calorimeter $M_c$ appears both in the numerator and the denominator and thereby cancels out. The specific heat is taken for the silicon at the average temperature from which $\Delta T$ is determined. The specific heat for silicon has been determined previously and reported in Phil. Mag. 4 page 273 - 1959 by P. Flubacher, A. J. Leadbetter, and J. A. Morrison.

In operation, the electrical circuit is adjusted to balance the output of the temperature sensing thermistor. The calorimeter is exposed to a pulse of radiation, simultaneously, the output of the temperature sensing element is monitored by the electrical circuitry to determine the change in temperature of the spherical element. This temperature change is noted. The temperature change noted is substituted into the dose formula along with the specific heat of the silicon sphere for the average temperature at which the sphere was measured upon being irradiated. Thus, the dose may be determined for radiation up to the maximum energy for which the calorimeter was designed.

The rapidity of radiation heating from an intense radiation pulse eliminates the need for evacuation of air from the calorimeter to provide adequate thermal insulation.

Figure 3:
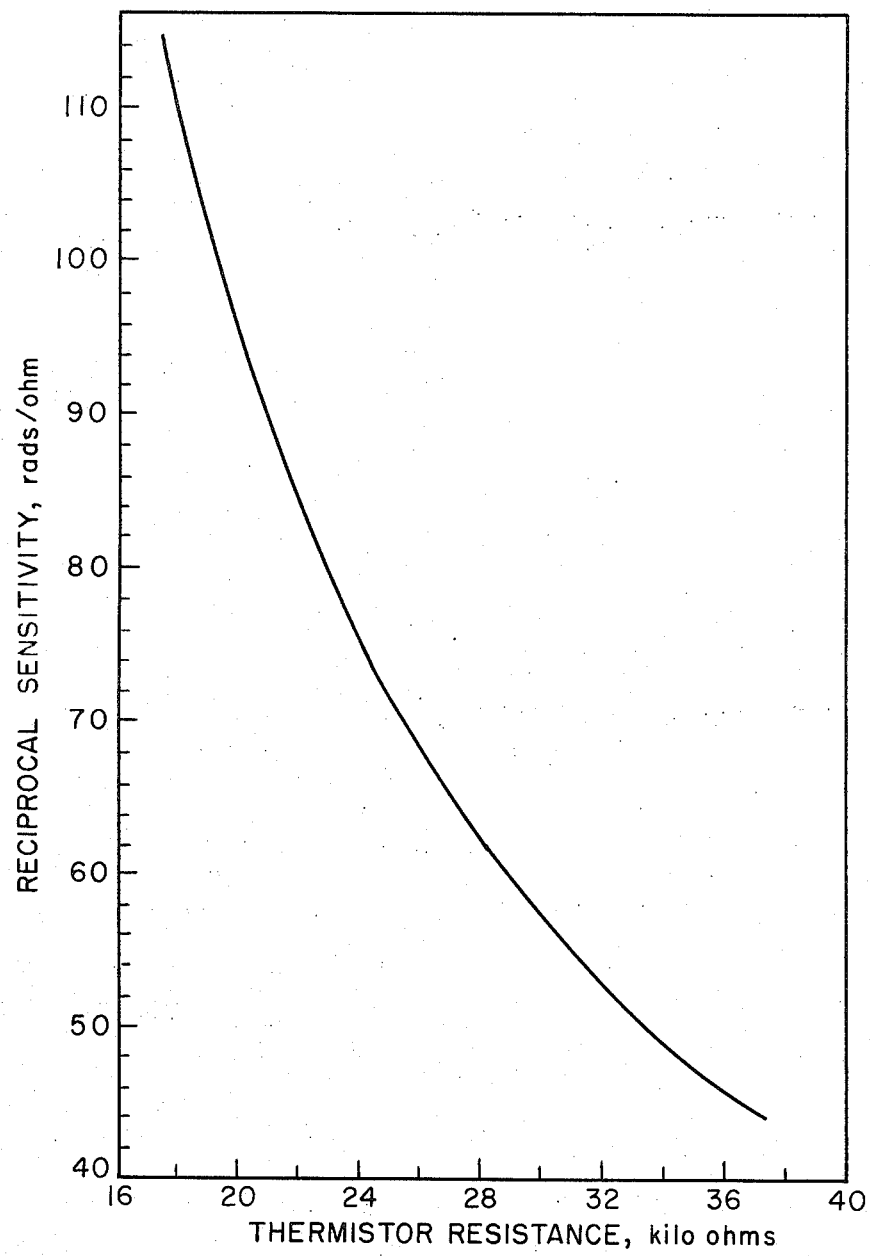
FIG. 3 is a curve indicating absorbed dose in silicon per unit decrease in thermistor resistance (rad/ohm), as a function of thermistor resistance in Kilo ohms.

A calibration curve combining the temperature dependence of the silicon's specific heat with the temperature calibration of an individual thermistor is shown in FIG. 3. This curve may be used in combination with the above described device to determine dose as set forth below. The resistance bridge is balanced to obtain the initial value of the thermistor resistance, for example, 37.79 K ohms. The spherical element is subjected to a dose of radiation. Due to the incident radiation, the resistance decreased from the initial value by 844 ohms which showed a heating of the sphere. The average value of resistance is obtained by dividing 844 by two to obtain a value of 422 ohms. Substracting this value from the initial value of 37.79 K ohms, gives an average resistance reading of 36.37 K ohms. Observing the curve, FIG. 3, for 36.37 ohms along the abscissa results in a reciprocal sensitivity value of 45.7 rads/ohm. This value is then multiplied by the resistance change of 844 ohms to obtain the dose of $3.86 \times 10^4$ rads. In this manner the dose is determined by use of the measured resistance value change of the thermistor rather than the temperature change in the sphere.

The radial thickness of the large sphere was determined empirically so as to locate the center of the small sphere at the maximum of the dose-VS-depth curve for X-rays produced by 14 MeV electrons. Thus, the small sphere is positioned so as to achieve equilibrium of secondary radiation produced by X-ray generation. The calorimeter set forth above has an outer sphere or mantle thickness suitable for measuring the maximum silicon dose with X-rays produced by 14 MeV electrons upon it. With any other X-ray spectrum a different thickness mantle should be used. In each case, the radial thickness of the outer sphere or mantle to produce equilibrium for the maximum energy radiation to be measured must be obtained empirically. This can be done by using thin thermoluminescent dosimeters.

The use of silicon has been set forth as being used in carrying out this invention. Other materials may be used which have well known specific heat characteristics.

Obviously many modifications and variations of the present invention are possible in the light of the above teachings. It is therefore to be understood that within the scope of the appended claims the invention may be practiced otherwise than as specifically described.

What is claimed is:

1. A calorimetric-radiation dosimeter for measuring radiation dose of incident radiation, which comprises;
a solid first sphere of heat conductive material,
a hollow second sphere of the same material as said first sphere surrounding said first sphere concentric therewith and in spaced relationship thereto,
a passage through said second sphere to the inside thereof,
a passage into said first sphere to the center thereof, said passage in alignment with said passage through said second sphere,
a temperature sensing means secured at the center of said first sphere for detection of any temperature change in said first sphere due to incident radiation.

2. A calorimeter-radiation dosimeter as claimed in claim 1; in which,
said temperature sensing sensing means resistivity varies in a reproducible manner with temperature change.

3. A calorimeter-radiation dosimeter as claimed in claim 1; wherein;
said first and second spheres are made of a material selectd from a group consisting of silicon, aluminum, graphite, as well as other pure material whose specific heat is known accurately.

4. A calorimeter-radiation dosimeter as claimed in claim 1; in which,
said first and second spheres are silicon.

5. A calorimeter-radiation dosimeter as claimed in claim 4; which includes;
a thin metal shell surrounding said second sphere for shielding against radio frequency interference to the measurement of said temperature sensing means.

6. A calorimeter-radiation dosimeter as claimed in claim 5; which includes,
a thermal insulator transport to incident radiation surrounding said ratio frequency shield.

7. A calorimeter-radiation dosimeter as claimed in claim 2; which includes,
a temperature measuring electrical circuit electrically connected to said temperature sensing means, and an indicator to indicate radiation dose.

* * * * *